United States Patent
Thomas et al.

(10) Patent No.: US 12,358,075 B2
(45) Date of Patent: Jul. 15, 2025

(54) OCCULTING DEVICE FOR OPTICAL SYSTEM IN ADDITIVE MANUFACTURING SYSTEMS

(71) Applicant: Rolls-Royce Corporation, Indianapolis, IN (US)

(72) Inventors: Baily Thomas, Bellefonte, PA (US); Scott Nelson, Indianapolis, IN (US); Abdalla R. Nassar, State College, PA (US); John Grubbs, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 439 days.

(21) Appl. No.: 17/533,664

(22) Filed: Nov. 23, 2021

(65) Prior Publication Data

US 2022/0161364 A1 May 26, 2022

Related U.S. Application Data

(60) Provisional application No. 63/117,735, filed on Nov. 24, 2020.

(51) Int. Cl.
*B23K 26/342* (2014.01)
*B22F 10/28* (2021.01)
(Continued)

(52) U.S. Cl.
CPC ............ *B23K 26/342* (2015.10); *B22F 10/28* (2021.01); *B22F 10/368* (2021.01); *B22F 12/40* (2021.01);
(Continued)

(58) Field of Classification Search
CPC .. B23K 26/342; B23K 26/064; B23K 26/034; B33Y 10/00; B33Y 30/00; B33Y 50/02;
(Continued)

(56) References Cited

U.S. PATENT DOCUMENTS

2008/0297909 A1 12/2008 Comstock
2014/0265046 A1 9/2014 Burris et al.
(Continued)

FOREIGN PATENT DOCUMENTS

EP 3482855 A2 5/2019
WO 2019040948 A1 2/2019

OTHER PUBLICATIONS

Barca, Francesco, Tomaso Caporossi, and Stanislao Rizzo. "Silicone oil: different physical proprieties and clinical applications." BioMed research international 2014 (2014). (Year: 2014).*

(Continued)

*Primary Examiner* — Elizabeth M Kerr
*Assistant Examiner* — Simpson A Chen
(74) *Attorney, Agent, or Firm* — Shumaker & Sieffert, P.A.

(57) ABSTRACT

An additive manufacturing system may include an energy delivery device configured to deliver energy to a component to form a melt pool at least partially surrounded by a cooling region; and an optical system comprising: an imaging device; and an occulting device, wherein the occulting device is configured to occult at least part of thermal (Continued)

emissions produced by the energy and the melt pool and transmit at least some thermal emissions produced by the cooling region.

20 Claims, 6 Drawing Sheets

(51) Int. Cl.
*B22F 10/368* (2021.01)
*B22F 12/40* (2021.01)
*B23K 26/03* (2006.01)
*B23K 26/064* (2014.01)
*B33Y 10/00* (2015.01)
*B33Y 30/00* (2015.01)
*B33Y 50/02* (2015.01)
*G02B 5/20* (2006.01)

(52) U.S. Cl.
CPC .......... *B23K 26/034* (2013.01); *B23K 26/064* (2015.10); *B33Y 10/00* (2014.12); *B33Y 30/00* (2014.12); *B33Y 50/02* (2014.12); *G02B 5/205* (2013.01)

(58) Field of Classification Search
CPC ........ B22F 12/40; B22F 10/28; B22F 10/368; G02B 5/205; G02B 5/24; G02B 26/004
USPC .................................................... 219/121.64
See application file for complete search history.

(56) References Cited

U.S. PATENT DOCUMENTS

| | | | |
|---|---|---|---|
| 2016/0357010 A1* | 12/2016 | Bolis ...................... | G02B 5/005 |
| 2017/0144371 A1* | 5/2017 | Lussier .................. | B33Y 50/02 |
| 2018/0154443 A1* | 6/2018 | Milshtein ........... | B23K 26/0626 |
| 2019/0270139 A1* | 9/2019 | Wuest ................... | B22F 10/368 |
| 2020/0033477 A1* | 1/2020 | Scaggs ............. | H01L 27/14629 |
| 2020/0110025 A1 | 4/2020 | Yacoubian | |
| 2020/0269492 A1* | 8/2020 | Wettstein .............. | B29C 64/264 |

OTHER PUBLICATIONS

Response to Extended Search Report dated Apr. 29, 2022, from counterpart European Application No. 21209116.9 filed Nov. 30, 2022, 10 pp.

Extended Search Report from counterpart European Application No. 21209116.9 dated Apr. 29, 2022, 8 pp.

Bourget et al., "A Coronagraph with a Variable-Diameter Occulting Disk," Publications of the Astronomical Society pf the Pacific, vol. 113, No. 782, Apr. 2001, pp. 436-438.

Bourget et al., "Extinction Controlled Adaptive Mask Coronagraph Lyot and Phase Mask Dual Concept for Wide Extinction Area," Modern Technologies in Space- and Ground-based Telescopes and Instrumentation II. Proceedings of the SPIE, vol. 8450, Sep. 2012, 10 pp.

\* cited by examiner

OCCULTING DEVICE FOR OPTICAL SYSTEM IN ADDITIVE MANUFACTURING SYSTEMS

This application claims the benefit of U.S. Provisional Application Ser. No. 63/117,735, entitled "OCCULTING DEVICE FOR OPTICAL SYSTEM IN ADDITIVE MANUFACTURING SYSTEMS", filed on Nov. 24, 2020, the entire content of which is incorporated herein by reference.

TECHNICAL FIELD

The disclosure relates to additive manufacturing techniques.

BACKGROUND

Additive manufacturing generates three-dimensional structures through addition of material layer-by-layer or volume-by-volume to form the structure, rather than removing material from an existing component to generate the three-dimensional structure. Additive manufacturing may be advantageous in many situations, such as rapid prototyping, forming components with complex three-dimensional structures, or the like. In some examples, additive manufacturing may utilize powdered materials and may melt or sinter the powdered material together in predetermined shapes to form the three-dimensional structures.

SUMMARY

In some examples, the disclosure describes an additive manufacturing system that includes an energy delivery device configured to deliver energy to a component to form a melt pool at least partially surrounded by a cooling region; and an optical system comprising: an imaging device; and an occulting device, wherein the occulting device is configured to occult at least part of thermal emissions produced by the energy and the melt pool and transmit at least some thermal emissions produced by the cooling region.

In some examples, the disclosure describes a method that includes controlling, by a computing device, an energy delivery device to deliver energy to a component to form a melt pool at least partially surrounded by a cooling region; and controlling, by the computing, an optical system to measure thermal emissions emitted by the cooling region, wherein the optical system comprises: an imaging device; and an occulting device, wherein the occulting device is configured to occult at least part of thermal emissions produced by the energy and the melt pool and transmit at least some thermal emissions produced by the cooling region.

The details of one or more examples are set forth in the accompanying drawings and the description below. Other features, objects, and advantages will be apparent from the description and drawings, and from the claims.

DETAILED DESCRIPTION

Figure 1:
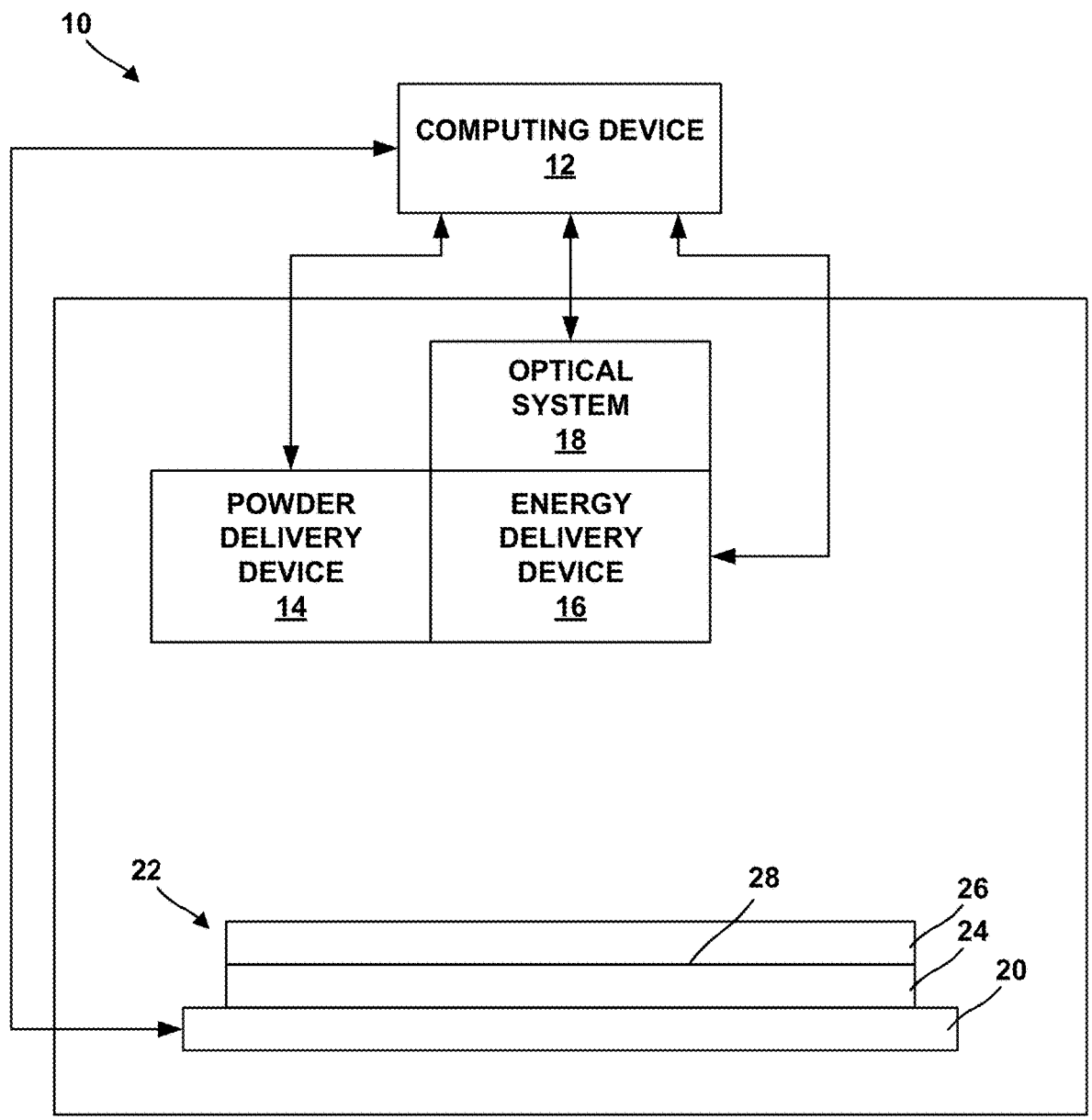
FIG. 1 is a conceptual block diagram illustrating an example additive manufacturing system that includes an optical system for observing thermal emissions around a melt pool formed during the additive manufacturing technique.

The disclosure generally describes techniques and systems for measuring thermal emissions during an additive manufacturing technique. Example systems may include an optical system that includes an occulting device. The occulting device may be positioned within the optical system and may be configured to at least partially block or reduce intensity at the sensor of emissions from the energy source, vapor, plume, and/or melt pool. By occulting bright emissions around the center melt pool, the systems and techniques described herein may enable detecting of fainter emissions in the solidifying regions nearer the edge of the melt pool and outside the melt pool, where microstructure of the component develops. This allows more accurate temperature measurements of the solidifying regions, which enables predictions of solidification microstructure and quality.

During additive manufacturing, a component is built up by adding material to the component in sequential layers. The final component is composed of a plurality of layers of material. In some additive manufacturing techniques for forming components from metals or alloys, an energy source may direct energy at a substrate to form a melt pool. A powder delivery device may deliver a powder to the melt pool, where at least some of the powder at least partially melts and is joined to the substrate. The melt pool cools as energy is no longer delivered to that location of the substrate (e.g., due to the energy source scanning the energy over the surface of the substrate). The temperature and cooling rate of the melt pool and the surrounding areas of the substrate affect the microstructure of the component formed using the additive manufacturing technique. Some additive manufacturing systems may include thermal cameras configured to measure thermal emissions during the additive manufacturing technique to measure temperature of the component being formed.

In many cases, the energy output by the energy source is very high temperature and the intensity of its thermal emissions is significantly greater than the intensity of thermal emissions from the melt pool and surrounding area. Similarly, thermal emissions intensity at and near the center of the melt pool may be significantly greater than the intensity of thermal emissions near the edge of the melt pool and in areas surrounding the melt pool. Because of this, it may be difficult to accurately measure temperature and cooling rate of areas near the edge of the melt pool and in areas surrounding the melt pool. This results in difficulty predicting and controlling microstructure of the additively manufactured part.

In accordance with techniques of this disclosure, an optical system may include at least one occulting device. The optical system may direct light from thermal emissions to a thermal imaging device. The at least one occulting device may be configured to at least partially block or reduce intensity at the sensor of emissions from the energy source, vapor, plume, and/or melt pool. By occulting bright emissions around the center melt pool, the systems and techniques described herein may enable detecting of fainter emissions in the solidifying regions nearer the edge of the melt pool and outside the melt pool, where microstructure of the component develops. This allows more accurate temperature measurements of the solidifying regions, which enables predictions of solidification microstructure and quality.

FIG. 1 is a conceptual block diagram illustrating an example system 10 for performing an additive manufacturing technique, which system 10 includes an optical system 18 for observing thermal emissions around a melt pool formed during the additive manufacturing technique. In the example illustrated in FIG. 1, system 10 includes a computing device 12, a powder delivery device 14, an energy delivery device 16, an optical system 18, and a stage 20. Computing device 12 is operably connected to powder delivery device 14, energy delivery device 16, optical system 18, and stage 20.

In some examples, stage 20 is movable relative to energy delivery device 16 and/or energy delivery device 16 is movable relative to stage 20. Similarly, stage 20 may be movable relative to powder delivery device 14 and/or powder delivery device 14 may be movable relative to stage 20. For example, stage 20 may be translatable and/or rotatable along at least one axis to position component 22 relative to energy delivery device 16 and/or powder delivery device 14. Similarly, energy delivery device 16 and/or powder delivery device 14 may be translatable and/or rotatable along at least one axis to position energy delivery device 16 and/or powder delivery device 14, respectively, relative to component 22. Stage 20 may be configured to selectively position and restrain component 22 in place relative to stage 20 during manufacturing of component 22.

Powder delivery device 14 may be configured to deliver material to selected locations of component 22 being formed. At least some of the material may impact a melt pool in component 22. The material that impacts the melt pool may be joined to component 22. In some examples, the material may be supplied by powder delivery device 14 in powder form.

In some examples, system 10 may be a blown powder additive manufacturing system. In some such systems, powder delivery device 14 may deliver the powder adjacent to the surface of component 22 by blowing the powder adjacent to the surface, e.g., as a mixture of the powder with a gas carrier. In some examples, powder delivery device 14 thus may be fluidically coupled to a powder source and a gas source, and powder delivery device 14 may include one or more nozzles or other mechanisms for directing the powder to a particular location. In some examples, powder delivery device 14 may be mechanically coupled or attached to energy delivery device 16 to facilitate delivery of powder and energy for forming the melt pool to substantially the same location adjacent to component 22.

In other examples, system 10 may be a powder bed additive manufacturing system. In some such examples, powder delivery device 14 may deliver the powder adjacent to the surface of component 22 by spreading the powder on the surface of component 22, such that the powder rests on the surface prior to portions of the powder and/or component 22 being heated. In some examples of a powder bed additive manufacturing system, powder delivery device 14 may include a device that spreads the powder or can otherwise manipulate the powder to move the powder within system 10.

Energy delivery device 16 may include an energy source, such as a laser source, an electron beam source, plasma source, or another source of energy that may be absorbed by component 22 to form a melt pool and/or be absorbed by the powder to be added to component 22. Example laser sources include a CO laser, a $CO_2$ laser, a Nd:YAG laser, or the like. In some examples, the energy source may be selected to provide energy with a predetermined wavelength or wavelength spectrum that may be absorbed by component 22 and/or the powder material to be added to component 22 during the additive manufacturing technique.

In some examples, energy delivery device 16 also includes an energy delivery head, which is operatively connected to the energy source. The energy delivery head may aim, focus, or direct the energy toward predetermined positions at or adjacent to a surface of component 22 during the additive manufacturing technique. As described above, in some examples, the energy delivery head may be movable in at least one dimension (e.g., translatable and/or rotatable) under control of computing device 12 to direct the energy toward a selected location at or adjacent to a surface of component 22.

Computing device 12 is configured to control components of system 10 and may include, for example, a desktop computer, a laptop computer, a workstation, a server, a mainframe, a cloud computing system, or the like. Computing device 12 is configured to control operation of system 10, including, for example, powder delivery device 14, energy delivery device 16, optical system 18, and/or stage 20. Computing device 12 may be communicatively coupled to powder delivery device 14, energy delivery device 16, optical system 18, and/or stage 20 using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like.

Computing device 12 may be configured to control operation of powder delivery device 14, energy delivery device 16, optical system 18, and/or stage 20 to position component 22 relative to powder delivery device 14, energy delivery device 16, optical system 18, and/or stage 20. For example, as described above, computing device 12 may control stage 20 and powder delivery device 14, energy delivery device 16, and/or one or more components of optical system 18 to translate and/or rotate along at least one axis to position component 22 relative to powder delivery device 14, energy delivery device 16, and/or optical system 18. Positioning component 22 relative to powder delivery device 14, energy delivery device 16, and/or optical system 18 may include positioning a predetermined surface (e.g., a surface to which material is to be added) of component 22 in a predetermined orientation relative to powder delivery device 14, energy delivery device 16, and/or optical system 18.

Computing device 12 may be configured to control system 10 to deposit layers 24 and 26 to form component 22. As shown in FIG. 1, component 22 may include a first layer 24 and a second layer 26, although many components may be formed of additional layers, such as tens, hundreds, thousands, or the like. Component 22 in FIG. 1 is simplified in geometry and the number of layers compared to many components formed using additive manufacturing techniques. Although techniques are described herein with respect to component 22 including first layer 24 and second layer 26, the technique may be extended to components 22 with more complex geometry and any number of layers.

To form component 22, computing device 12 may control powder delivery device 14 and energy delivery device 16 to form, on a surface 28 of first layer of material 24, a second layer of material 26 using an additive manufacturing technique. Computing device 12 may control energy delivery device 16 to deliver energy to a volume at or near surface 28 to form a melt pool. For example, computing device 12 may control the relative position of energy delivery device 16 and stage 20 to direct energy to the volume. Computing device 12 also may control powder delivery device 14 to deliver powder to the melt pool. For example, computing device 12 may control the relative position of powder delivery device 14 and stage 20 to direct powder at or on to the melt pool.

Optical system 18 may include an imaging device and an associated optical train, which senses emissions at or near component 22 during the additive manufacturing technique. For example, optical system 18 may include a visible light imaging device, an infrared imaging device, or an imaging device that is configured (e.g., using a filter) to image a specific wavelength or wavelength range.

The optical train may include one or more reflective, refractive, diffractive optical components configured to direct light to the imaging device. For example, the optical train may be configured to direct light from near component 22 and/or the melt pool formed in component 22 to the imaging device. In some examples, at least a portion of the optical train is coaxial with the axis at which energy delivery device 16 outputs energy, and the at least a portion of the optical train may be attached to or otherwise configured to move with the portion of energy delivery device 16 that directs or focuses the energy at or near the surface of component 22. In this way, optical system 18 may move with energy delivery device 16 and track the melt pool as the melt pool moves across component 22, without needing to correct for any offsets between energy delivery device 16 and optical system 18 and/or needing to correct for geometry of component 22. In other examples, the optical train may not be coaxial with the axis at which energy delivery device 16 outputs energy, and computing device 12 may be configured to compensate for the offset and any affects this may have on the imaging, including shadowing, interference, geometry of component 22, or the like.

In accordance with techniques of this disclosure, optical system 18 includes an occulting device. The occulting device is configured to reduce or block emissions (e.g., thermal emissions) that originate from the energy output by energy delivery device 16 and/or near a center of the melt pool, which otherwise obfuscate emissions from solidifying regions of material at or near the edge of the melt pool and outside of the melt pool. The occulting device may be a rigid occulting device or a dynamic occulting device. A rigid occulting device reduces or blocks emissions from a fixed region, e.g., from the energy output by energy delivery device 16. For instance, a rigid occulting device may include a device with fixed dimensions that is opaque to wavelengths of interest. As another example, a rigid occulting device may include an apodizing lens in which a center of the lens if substantially opaque to wavelengths of interest and opacity decreases as a function of radius.

A dynamic occulting device is configured to be controlled to occult different regions, e.g., different sizes and/or shapes. A dynamic occulting device may include a rigid occulting device that is mounted to a device that can translate the rigid occulting device along and/or perpendicularly to the optical axis. As another example, a dynamic occulting device may include an opaque and viscous liquid, such as mercury, contained between two substrates. The substrates are substantially transparent to the wavelength(s) of interest. One or both of the substrates may be movable relative to the other substrate to control the distance between the substrates. By reducing the distance between the substrates, the size of the occulting region may increase. By increasing the distance between the substrates, the size of the occulting region may decrease. As a third example, a dynamic occulting device may include a digital micromirror device. Computing device 12 may be configured to control the micromirrors of the digital micromirror device to direct emissions that originate from the energy output by energy delivery device 16 and/or near a center of the melt pool away from the imaging device. A digital micromirror device may enable control of both the size and shape of the region of emissions that are occulted.

Figure 2:
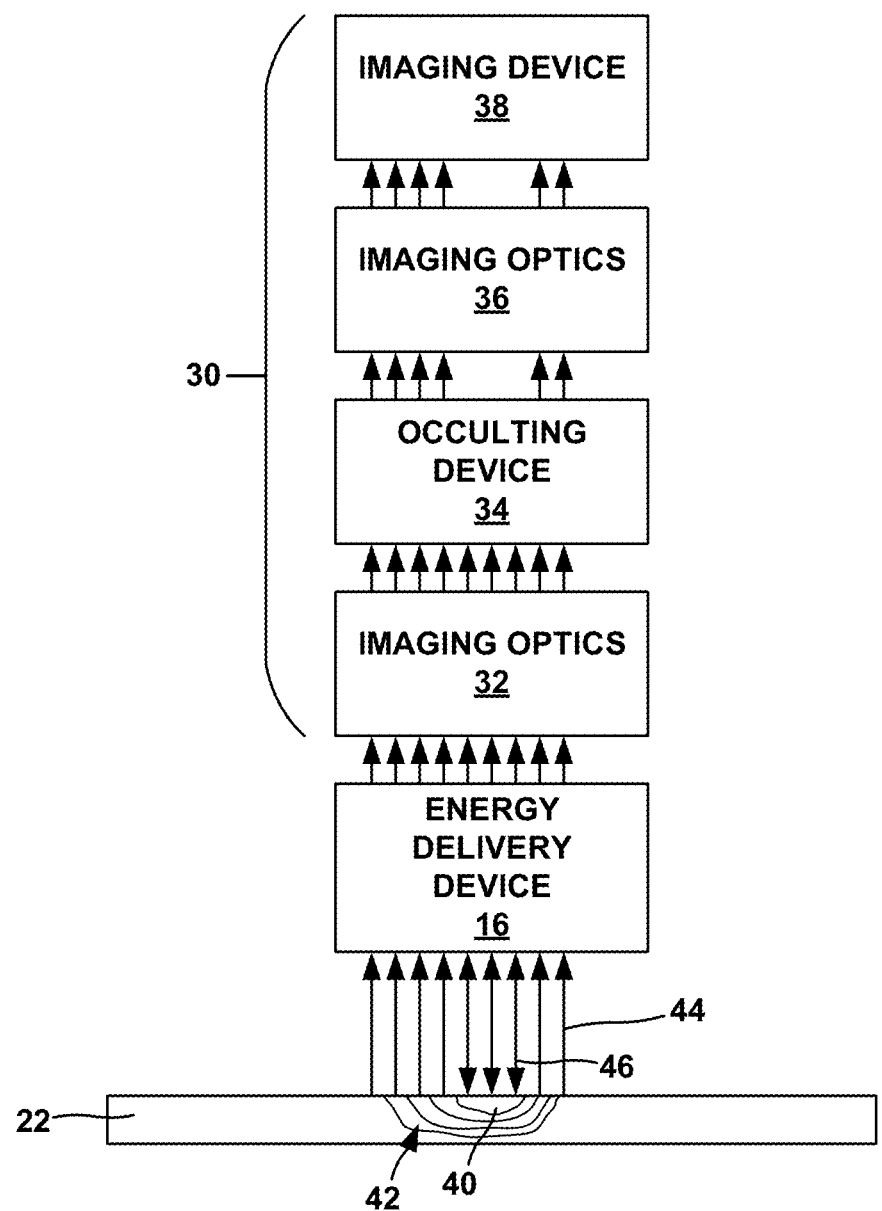
FIG. 2 is a conceptual block diagram illustrating an example optical system for observing thermal emissions around a melt pool formed during the additive manufacturing technique.

FIG. 2 is a conceptual block diagram illustrating an example optical system 30 for observing thermal emissions at and/or around a melt pool formed during an additive manufacturing technique. Optical system 30 is an example of optical system 18 of FIG. 1.

Optical system 30 includes an optical train that includes first imaging optics 32, occulting device 34, second imaging optics 36, and imaging device 38. Imaging device 38 may be any suitable imaging device, including, for example, a visible light imaging device, an infrared imaging device, an imaging device that is configured (e.g., using a filter) to image a specific wavelength or wavelength range, a two color pyrometry imaging device, or the like.

First and second imaging optics 32 and 36 may each include one or more optical devices used to direct light to imaging device 38. For example, First and second imaging optics 32 and 36 may each include one or more refractive optical device (e.g., a lens), one or more reflective optical device (e.g., a mirror), one or more diffractive optical devices (e.g., a grating), one or more dichroic optical devices (e.g., a dichroic filter or mirror), or the like. Although two sets of imaging optics 32 and 38 are shown in FIG. 2, in other examples, system 30 may include a single set of imaging optics or more than two sets of imaging optics.

Occulting device 34 is positioned within the optical train between first imaging optics 32 and second imaging optics 36. In other example, occulting device 34 may be positioned between imaging device 38 and imaging optics 36 or after before imaging optics 32. In some examples, occulting device 34 is positioned as the optical component nearest imaging device. This effectively results in removal of the portion of the image which occulting device 34 blocks. In other examples, occulting device 34 is positioned at another position within the optical train where the image of component 22 resolves. Imaging optics 36 then may be configured to image occulting device 34 onto imaging device.

As shown in FIG. 2, in some examples, at least a portion of optical system 30 is coaxial with the axis at which energy delivery device 16 outputs energy 46. For example, at least a portion of second imaging optics 32 (e.g., the portion at which emitted light 44 is incident upon second imaging optics 32) may be coaxial with the axis at which energy delivery device 16 outputs energy 46. This may reduce image manipulation that otherwise may be applied to the resulting image to correct for geometry of component 22, angular offset of optical system 30 relative to energy delivery device 16, shadowing due to the angular offset, interference, or the like. In other examples, optical system 30 (e.g., the portion at which emitted light 44 is incident upon second imaging optics 32) may not be coaxial with the axis at which energy delivery device 16 outputs energy 46, and computing device 12 (FIG. 1) or another computing device may be configured to manipulate the resulting image to compensate for geometry of component 22, angular offset of optical system 30 relative to energy delivery device 16, shadowing due to the angular offset, interference, or the like.

FIG. 2 also illustrates energy delivery device 16 outputting energy 46, which is incident upon component 22 and results in formation of melt pool 40. Surrounding melt pool is a cooling zone 42, in which temperature gradients from the temperature of melt pool 40 to ambient temperature are present. As shown in FIG. 2, melt pool 40 and cooling zone 42 emit thermal emissions 44 (e.g., thermal radiation), which travels through optical system 30 to imaging device 38, which images the thermal emissions 44. Occulting device 34 occults (e.g., reduces the intensity of or substantially eliminates) thermal emissions 44 from a selected region, e.g., a region corresponding to energy 46 and at least a portion of melt pool 40. This may allow imaging device 38 to more effectively image relatively lower intensity thermal emissions from at or near the edge of melt pool 40 and within cooling zone 42. This may enable more accurate measurement of temperatures within the cooling zone 42, which may enable more accurate prediction of microstructure formed within component 22 due to temperatures and cooling rates within cooling zone 42. By enabling more accurate predictions of microstructure, this may enable enhanced control of the additive manufacturing process to achieve desired microstructures within component 22.

Figure 3:
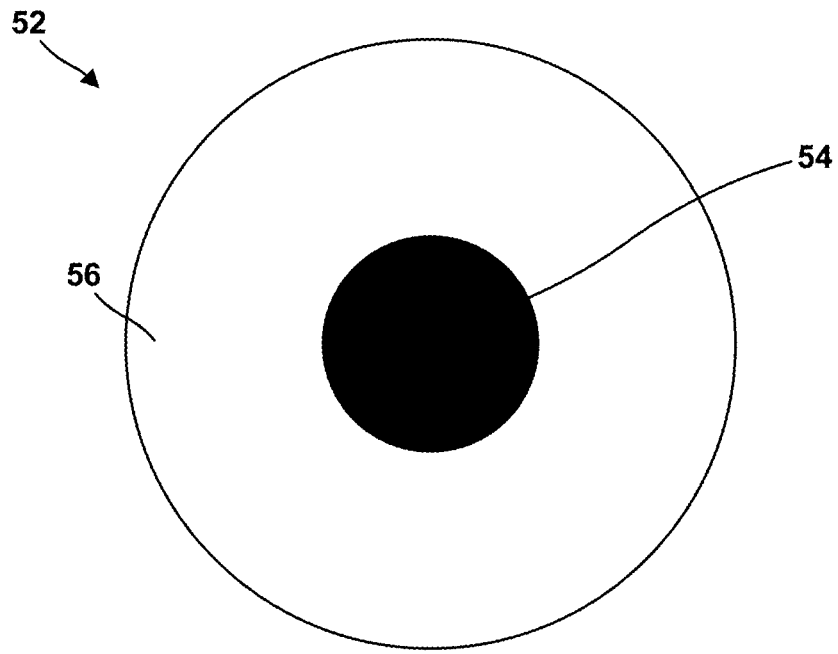
FIG. 3 is a conceptual diagram of an example rigid diameter occulting disk.

As described above with reference to FIG. 1, occulting device 34 may include any a rigid occulting device or a dynamic occulting device. FIG. 3 is a conceptual diagram of an example rigid diameter occulting disk 52. Rigid diameter occulting disk 52 includes a central region 54 that is substantially opaque to the wavelength range of interest (e.g., the wavelength range of thermal emissions 44) and an annular region 56 that is substantially transparent to the wavelength range of interest. The size and shape of central region 54 may be selected based on the desired region of thermal emissions 44 to be occulted, the position of rigid diameter occulting disk 52 within optical system 30 (FIG. 2), or the like.

Figure 4:
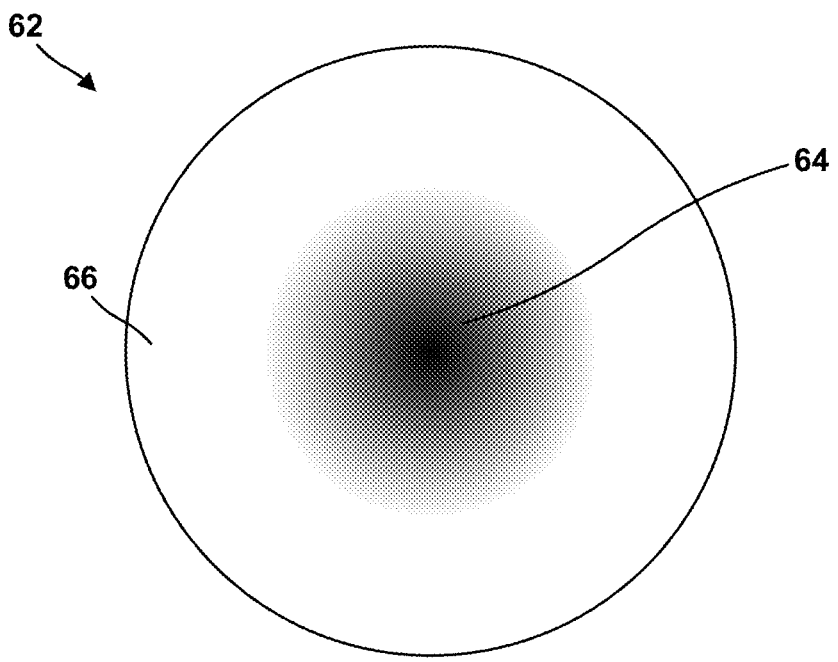
FIG. 4 is a conceptual diagram of an example apodizing reflective neutral density filter.

FIG. 4 is a conceptual diagram of another example rigid occulting device, an apodizing reflective neutral density filter 62. Apodizing reflective neutral density filter 62 is similar to rigid diameter occulting disk 52, but, instead of including a step-change in opacity between central region 54 and annular region 56, apodizing reflective neutral density filter 62 includes a gradient in opacity between central region 64 and annular region 66. This allows a transition in intensity of emissions that are transmitted by the occulting device and may be used to smooth intensity differences between the melt pool 40 and the cooling zone 42 (FIG. 2).

In some examples, the rigid occulting device may be configured to be moved within optical system to control a size of the region of thermal emissions 44 that is occulted. For example, rigid diameter occulting disk 52 or apodizing reflective neutral density filter 62 may be mounted within optical system 30 (FIG. 2) in a manner that allows rigid diameter occulting disk 52 or apodizing reflective neutral density filter 62 to be translated along the optical axis of optical system 30, e.g., closer to or further from imaging optics 36. Rigid diameter occulting disk 52 or apodizing reflective neutral density filter 62 may be mounted to a linear actuator, a motor, a piezoelectric device, or the like, which computing device 12 (FIG. 1) controls to translate rigid diameter occulting disk 52 or apodizing reflective neutral density filter 62 along the optical axis of optical system 30. In this way, computing device 12 may control the size of the region of thermal emissions 44 that is occulted by moving rigid diameter occulting disk 52 or apodizing reflective neutral density filter 62 within optical system 30.

Figure 5A:
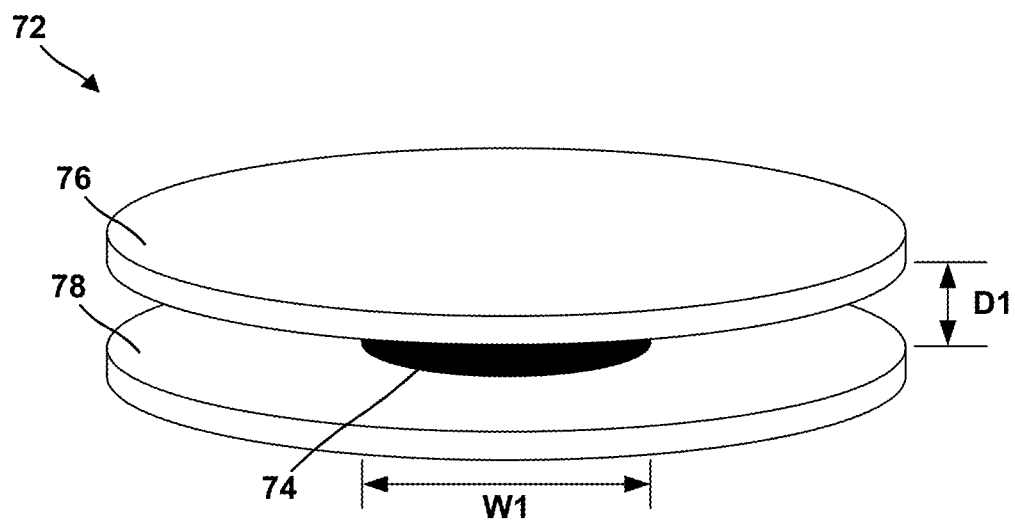
FIGS. 5A and 5B are conceptual diagrams of another dynamic occulting device that includes a viscous opaque liquid between two substrates.
Figure 5B:
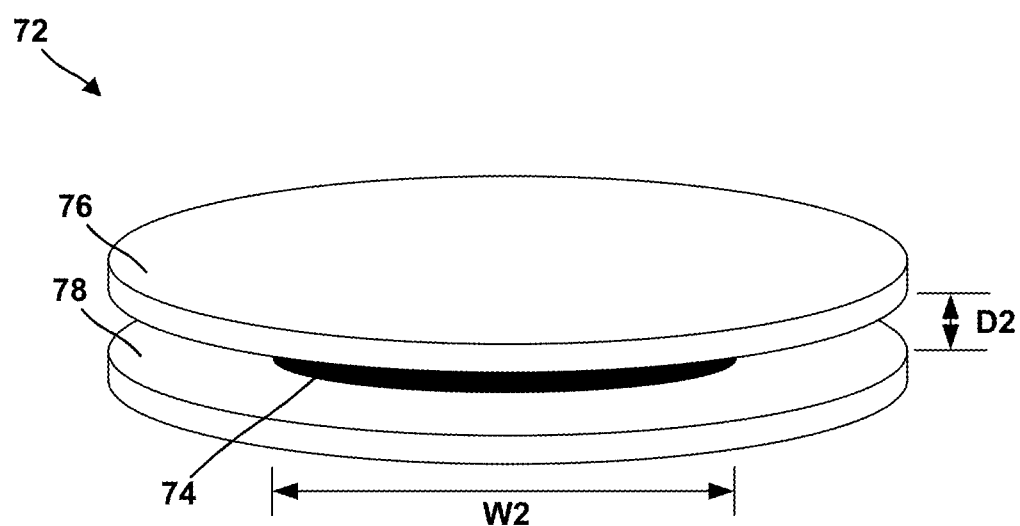

FIGS. 5A and 5B are conceptual diagrams of another dynamic occulting device 72 that includes a viscous opaque liquid 74 between two substrates 76, 78. In dynamic occulting device 72, the diameter of the viscous opaque liquid 74 may be changed by controlling a distance between substrates 76 and 78. For example, as shown in FIGS. 5A and 5B, when the distance, D1, between first substrate 76 and second substrate 78 is greater, the diameter, W1, of viscous opaque liquid 74 may be relatively smaller. On the other hand, when the distance, D2, between first substrate 76 and second substrate 78 is smaller, the diameter, W2, of viscous opaque liquid 74 may be relatively larger. In this way, by controlling the distance between first substrate 76 and second substrate 78, computing device 12 (FIG. 1) may control a size of the region of thermal emissions 44 (FIG. 2) that is occulted.

Each of substrates 76 and 78 may be substantially transparent to wavelengths of interest (e.g., wavelengths of thermal emissions 44 (FIG. 2)). For example, substrates 76 and 87 may be formed of glass, sapphire, transparent polymer, or the like. Substrates 76 and 78 may be formed from the same material or different materials. Viscous opaque liquid 74 may be substantially opaque to the wavelengths of interest and may be relatively viscous so that viscous opaque liquid 74 does not flow out of the space between substrates 76 and 78. Further, viscous opaque liquid 74 may have surface tension sufficient to urge viscous opaque liquid 74 to a smaller diameter upon substrates 76 and 78 moving apart. In some examples, viscous opaque liquid 74 may be mercury.

One or both of substrates 76 and 78 may be configured to be moved, e.g., along the optical axis of optical system 30 (FIG. 2), relative to the other of substrates 76 and 78. For example, one or both of substrate 76 and 78 may mounted to a linear actuator, a motor, a piezoelectric device, or the like. Computing device 12 may control the linear actuator, motor, piezoelectric device, or the like to control the space between substrates 76 and 78.

Figure 6:
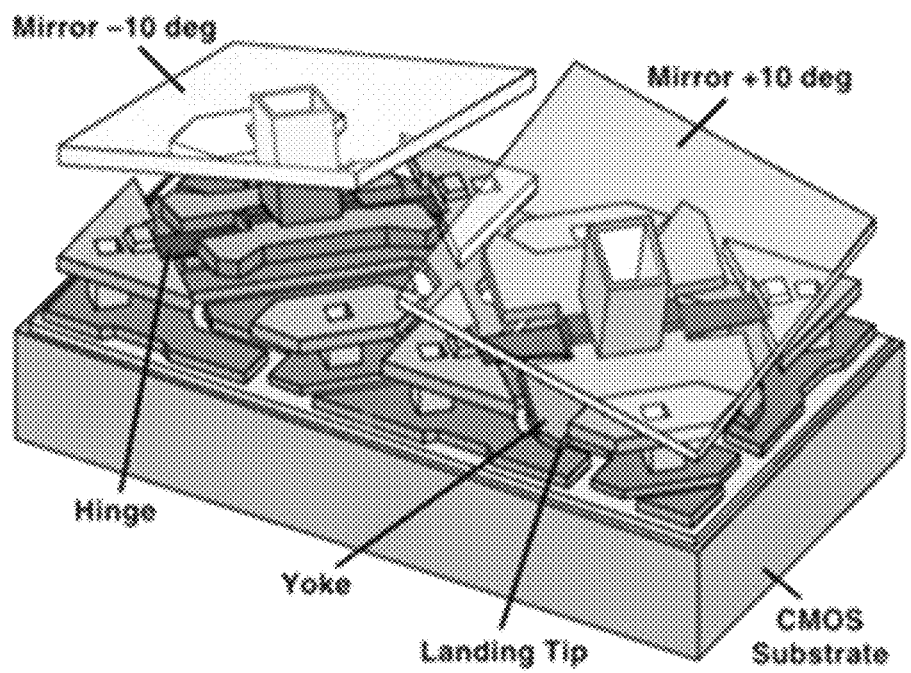
FIG. 6 is a conceptual diagram of another example variable occulting device, which includes a digital micromirror device.

FIG. 6 is a conceptual diagram of another dynamic occulting device 82, which includes a digital micromirror device (e.g., an array of micromirrors driven digitally). Although the digital micromirror device in FIG. 2 includes two micromirrors 84 and 86, a micromirror array used as a dynamic occulting device 82 may include tens, hundreds, or thousands of micromirrors.

As shown in FIG. 6, each micromirror 84, 86 may be mounted on a suspended yoke 88 with a torsion spring or hinge 90. CMOS substrate 92 includes a plurality of SRAM cells, two more SRAM cells located below each micromirror 84, 86. By programming a state of each SRAM cell, the position of the corresponding micromirror 84, 86 may be controlled. Computing device 12 may be configured to control programming of the state of each SRAM cell. Computing device 12 may be configured to control programming of the state of each SRAM cell to direct light from selected regions of thermal emissions 44 toward or away from imaging device 38 (FIG. 2). In this way, computing device 12 may control a size and/or shape of the region of thermal emissions 44 that is occulted.

Figure 7:
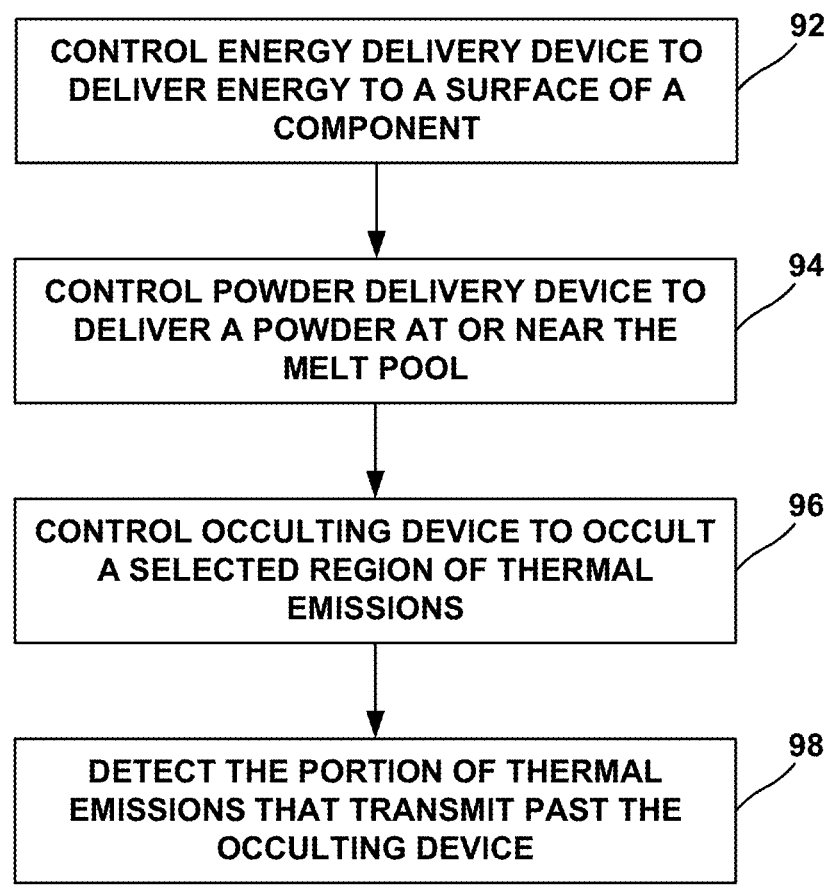
FIG. 7 is a flow diagram illustrating an example technique for measuring thermal emissions during an additive manufacturing technique.

FIG. 7 is a flow diagram illustrating an example technique for measuring thermal emissions during an additive manufacturing technique. The technique of FIG. 7 will be described with reference to FIGS. 1 and 2. A person having ordinary skill in the art will appreciate that the technique of FIG. 7 may be implemented using other systems.

Computing device 12 may control energy delivery device 16 to deliver energy to a surface of component 22 to form a melt pool (92) and control powder delivery device 14 to deliver a powder at or near melt pool 40 (94). At least some of the powder impacts melt pool 40 and is joined to component 22.

Due to the temperature of melt pool 40 and cooling zone 42, melt pool 40 and cooling zone 42 emit thermal emissions 44. The thermal emissions 44 from melt pool 40 may have a relatively high intensity relative to the thermal emissions 44 from cooling zone 42. Further, the energy output by energy source 16 may have a relatively high intensity relative to the thermal emissions 44 from cooling zone 42.

Optical system 30 includes an occulting device 34, which occults a portion of thermal emissions 44. In some examples, occulting device 34 is a rigid occulting device, and imaging device 38 simply detects the portion of thermal emissions 44 that transmit past occulting device 34 (98). In other examples, occulting device 34 is a dynamic occulting device 12, and computing device 12 controls occulting device 34 to occult a selected region of thermal emissions 44 (96). Imaging device 38 then detects the portion of thermal emissions 44 that transmit past occulting device 34 (98).

In some examples, computing device 12 may be configured to control imaging device 38 to measure the intensity of thermal emissions 44 across a sensor of imaging device 38, and computing device 12 or another computing device may be configured to determine an intensity profile across the sensor. Computing device 12 or the other computing device then may be configured to control occulting device 34 to occult a selected region to achieve a desired intensity profile. For instance, computing device 12 may control occulting device 34 to increase or decrease a size of the occulted region and/or may control occulting device 34 to modify a shape of the occulted region. In other examples, rather than using an output of imaging device 38 to determine the intensity profile of thermal emissions 44, system 10 may include a separate imaging device (e.g., a visual wavelength camera), which computing device 12 may use to determine a size and/or shape of melt pool 40. Computing device 12 then may control occulting device 34 to increase or decrease a size of the occulted region and/or may control occulting device 34 to modify a shape of the occulted region.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. An additive manufacturing system comprising:
an energy delivery device configured to deliver energy to a component to form a melt pool at least partially surrounded by a cooling region; and
an optical system comprising:
an imaging device; and
an occulting device, wherein the occulting device is configured to:
occult at least part of thermal emissions with a wavelength of interest from a selected region to reduce the intensity of the thermal emissions from the selected region, wherein the thermal emissions from the selected region are produced by the energy and the melt pool, and
transmit at least some thermal emissions with the wavelength of interest produced by the cooling region at least partially surrounding the melt pool, wherein the wavelength of the thermal emissions from the selected region that are occulted by the occulting device is the same as the wavelength of the thermal emissions produced by the cooling region that are transmitted past the occulting device,
wherein the imaging device is configured to detect and image the thermal emissions of the cooling region that are transmitted past the occulting device, wherein the detection of the thermal emissions of the cooling regions transmitted past the occulting device is enabled by the occulting of the thermal emissions from the selected region, wherein the thermal emissions detected and imaged by the imaging device allow for measurement of temperature within the cooling region when a material is solidifying within the cooling region, wherein the additive manufacturing system is configured to predict a microstructure of the material when solidified based on the measured temperature, and wherein the occulting device prevents the imaging device from imaging thermal emissions of the melt pool by the occulting of the thermal emissions from the selected region.

2. The additive manufacturing system of claim 1, wherein the occulting device comprises a rigid diameter occulting disk with a central region that is opaque to the thermal emission with the one or more wavelengths of interest and an annular region that is transparent to the thermal emissions with the one or more wavelengths of interest.

3. The additive manufacturing system of claim 2, wherein the occulting device comprises an apodizing reflective neutral density filter with a gradient in opacity to the thermal emissions with the one or more wavelengths of interest between the central region and the annular region.

4. The additive manufacturing system of claim 1, wherein the occulting device comprises at least one of a rigid diameter occulting disk or an apodizing reflective neutral density filter configured to be translated along an optical axis of the optical system.

5. The additive manufacturing system of claim 1, wherein the occulting device comprises a viscous opaque liquid between two substrates.

6. The additive manufacturing system of claim 1, wherein the occulting device comprises a digital mirror device.

7. The additive manufacturing system of claim 1, further comprising a computing device configured to control the energy delivery device and the occulting device, and wherein the computing device is configured to predict the microstructure of the material when solidified based on the measured temperature.

8. The additive manufacturing system of claim 1, further comprising a powder delivery device configured to deliver a powder to the melt pool.

9. The additive manufacturing system of claim 7, wherein the occulting device comprises a dynamic occulting device, and wherein the computing device is configured to control the dynamic occulting device to occult the selected region based on an intensity profile detected by the imaging device to achieve a desired intensity profile.

10. The additive manufacturing system of claim 1, wherein the measurement of the temperature within the cooling region from the thermal emissions imaged by the imaging device is more accurate with the occulting of the at least part of the thermal emissions by the occulting device compared to a measurement without the occulting of the at least part of the thermal emissions by the occulting device.

11. The additive manufacturing system of claim 1, wherein the occulting device comprises a dynamic occulting device, the dynamic occulting device including a viscous opaque liquid between a first substrate and a second substrate, wherein the computing device is configured to control a diameter of the viscous opaque liquid to occult the at least part of thermal emissions from the selected region and transmit the at least some thermal emission produced by the cooling region, wherein the computing device controls the diameter of the viscous opaque liquid by controlling a distance between the first substrate and the second substrate.

12. A method comprising:
controlling, by a computing device, an energy delivery device to deliver energy to a component to form a melt pool at least partially surrounded by a cooling region;
controlling, by the computing device, an optical system to measure thermal emissions emitted by the cooling region, wherein the optical system comprises:
an imaging device; and
an occulting device, wherein the occulting device is configured to:
occult at least part of thermal emissions with a wavelength of interest from a selected region to reduce the intensity of the thermal emissions from the selected region, wherein the thermal emissions from the selected region are produced by the energy and the melt pool, and
transmit at least some thermal emissions with the wavelength of interest produced by the cooling region at least partially surrounding the melt pool, wherein the wavelength of the thermal emissions from the selected region that are occulted by the occulting device is the same as the wavelength of the thermal emissions produced by the cooling region that are transmitted past the occulting device,
wherein the imaging device is configured to detect and image the thermal emissions of the cooling region that are transmitted past the occulting device, wherein the detection of the thermal emissions of the cooling regions transmitted past the occulting device is enabled by the occulting of the thermal emissions from the selected region, wherein the thermal emissions detected and imaged by the imaging device allow for measurement of temperature within the cooling region when a material is solidifying within the cooling region, wherein the occulting device prevents the imaging device from imaging thermal emissions of the melt pool by the occulting of the thermal emissions from the selected region; and
predicting, via the computing device, a microstructure of the material when solidified based on the measured temperature.

13. The method of claim 12, wherein the occulting device comprises a rigid diameter occulting disk with a central region that is opaque to the thermal emission with the one or more wavelengths of interest and an annular region that is transparent to the thermal emissions with the one or more wavelengths of interest.

14. The method of claim 13, wherein the occulting device comprises an apodizing reflective neutral density filter with a gradient in opacity to the thermal emissions with the one or more wavelengths of interest between the central region and the annular region.

15. The method of claim 12, wherein the occulting device comprises at least one of a rigid diameter occulting disk or an apodizing reflective neutral density filter configured to be translated along an optical axis of the optical system, and wherein the method further comprises:
controlling, by the computing device, a position of the at least one of the rigid diameter occulting disk or the apodizing reflective neutral density filter along the optical axis of the optical system to control a size of the selected region of thermal emissions occulted by the occulting device.

16. The method of claim 12, wherein the occulting device comprises a viscous opaque liquid between two substrates, and wherein the method further comprises:

controlling, by the computing device, a position of at least one of the substrates to control a diameter the viscous opaque liquid.

17. The method of claim 12, wherein the occulting device comprises a digital mirror device, and wherein the method further comprises:

controlling, by the computing device, the digital mirror device to control at least one of a size or shape of the selected region of thermal emissions occulted by the occulting device.

18. The method of claim 12, further comprising controlling, by the computing device, a powder delivery device to deliver a powder to the melt pool.

19. The method of claim 12, further comprising controlling, by the computing device, a dynamic occulting device to occult the selected region based on an intensity profile detected by the imaging device to achieve a desired intensity profile.

20. An additive manufacturing system comprising:

a computing device;

an energy delivery device configured to deliver energy to a component to form a melt pool at least partially surrounded by a cooling region; and an optical system comprising:

an imaging device; and an occulting device, wherein the occulting device is configured to:

occult at least part of thermal emissions with a wavelength of interest from a selected region to reduce the intensity of the thermal emissions from the selected region, wherein the thermal emissions from the selected region are produced by the energy and the melt pool, and transmit at least some thermal emissions with the wavelength of interest produced by the cooling region at least partially surrounding the melt pool, wherein the wavelength of the thermal emissions from the selected region that are occulted by the occulting device is the same as the wavelength of the thermal emissions produced by the cooling region that are transmitted past the occulting device, wherein the occulting device comprises a dynamic occulting device, and wherein the computing device is configured to control the dynamic occulting device to occult the selected region based on an intensity profile detected by the imaging device to achieve a desired intensity profile, wherein the imaging device is configured to detect and image the thermal emissions of the cooling region that are transmitted past the occulting device, wherein the detection of the thermal emissions of the cooling regions transmitted past the occulting device is enabled by the occulting of the thermal emissions from the selected region, wherein the thermal emissions detected and imaged by the imaging device allow for measurement of temperature within the cooling region when a material is solidifying within the cooling region, wherein the occulting device prevents the imaging device from imaging thermal emissions of the melt pool by the occulting of the thermal emissions from the selected region, wherein the computing device is configured to predict a microstructure of the material when solidified based on the measured temperature and wherein the measurement of the temperature within the cooling region from the thermal emissions imaged by the imaging device is more accurate with the occulting of the at least part of the thermal emissions by the occulting device compared to a measurement without the occulting of the at least part of the thermal emissions by the occulting device.

\* \* \* \* \*